United States Patent [19]

Shroyer

[11] Patent Number: 4,688,408
[45] Date of Patent: Aug. 25, 1987

[54] MULTI-AXLE WHEEL LOCKING BAR

[76] Inventor: Louis R. Shroyer, Box 1747, Kerrville, Tex. 78028

[21] Appl. No.: 912,084

[22] Filed: Sep. 29, 1986

[51] Int. Cl.⁴ .............................................. B60R 25/00
[52] U.S. Cl. ........................................ 70/226; 70/232
[58] Field of Search ................ 70/226, 225, 227, 209, 70/210, 211, 229, 232, 238, 461

[56] References Cited

U.S. PATENT DOCUMENTS 1,443,009 1/1923 Davis ..................................... 70/226
3,190,090 6/1965 Zaidener ............................... 70/238
4,192,537 3/1980 Laine ..................................... 70/461

Primary Examiner—Robert L. Wolfe
Attorney, Agent, or Firm—Gunn, Lee & Jackson

[57] ABSTRACT

Wheel locking device to prevent the theft of tandem axle trailers. This device consists of a rod with brackets at either end. The brackets have holes through which the lug nuts of the wheels pass. The lug nuts are affixed to the lugs of the wheels to secure the bar to each of the wheels. A cover attached to each end of the rod is fixed over the lug nuts, which prevents removal of the rod from the wheels. The cover is locked into place with a protected lock and key device.

7 Claims, 4 Drawing Figures

MULTI-AXLE WHEEL LOCKING BAR

BACKGROUND OF THE INVENTION

This invention relates to anti-theft devices for tandem wheel vehicles, primarily dual axle trailers. More particularly, it relates to a device which will secure each end of a bar to the wheels of a tandem axle trailer. The invention prevents removal of the bar from the wheels without a key. When the wheels are linked together with this bar, the movement of one wheel will transfer torque to the second wheel. In this fashion, the wheels of the trailer are prevented from rotating and so prevent theft of the trailer.

BRIEF DESCRIPTION OF THE PRIOR ART

Trailers are very useful and popular. Many trailers are of the tandem wheel design. For example, tandem wheel trailers are frequently used for recreational vehicles, horse trailers, boat trailers, and tractor trailers.

When trailers are left unattended, they often fall prey to thieves. A thief with an auto hitch may drive up to the trailer, hitch it up, and drive away. This results in a significant loss to the owner, both of the trailer and its contents.

A number of anti-theft devices have focused on the trailer mounting coupler at the front end of the trailer. These devices prevent hook-up between the trailer hitch mounting ball on the vehicle and the trailer coupler on the front end of the trailer. Such devices are frequently ineffectual since the thief may by-pass the mounting mechanism and secure the trailer by other means to the rear of the truck or automobile.

Other anti-theft devices secure the trailer to an immobile object. These devices use case-hardened steel link chain and padlocks. However, they are limited in their usefulness as they require a fixed object to which to secure the trailer.

A means of securing trailers particularly addressed to tandem wheel trailers is a double wedge device, with the apex of each wedge secured to a bar. The double wedges are held between the tires of a dual axle trailer by an adjustable clamp. The clamp may be padlocked for security. However, a crow bar or a breaker bar can use the rim of the wheel for leverage, and pop the wedge out from between the wheels. This is especially simple if pressure has been released from the tires.

The invention departs from the prior art of trailer security devices by using a bar which is securely fastened to the wheels of a multi-axle trailer. When securely affixed, rotation of the wheels of the trailer is prevented.

SUMMARY OF THE INVENTION

It is an object of the present invention to produce a locking device which will prevent the theft of multi-axle trailers by preventing the wheels from rotating.

A further object of this invention is to fasten a wheel locking bar to the lug bolts of each of the wheels of a tandem axle trailer.

A further object of this invention to prevent the removal of the locking bar from the wheels by preventing access to the lug nuts that secure the bar to the wheels.

A further object is to provide a simple, fast, and effective means of securing two wheels of a multi axle trailer, one wheel to the other.

DESCRIPTION OF THE PREFERRED EMBODIMENT

The preferred embodiment of the invention is described and illustrated in FIGS. 1–4. The components of the invention are preferably made of good quality steel, to make it difficult to cut, saw or otherwise dismantle the lock bar.

Figure 1:
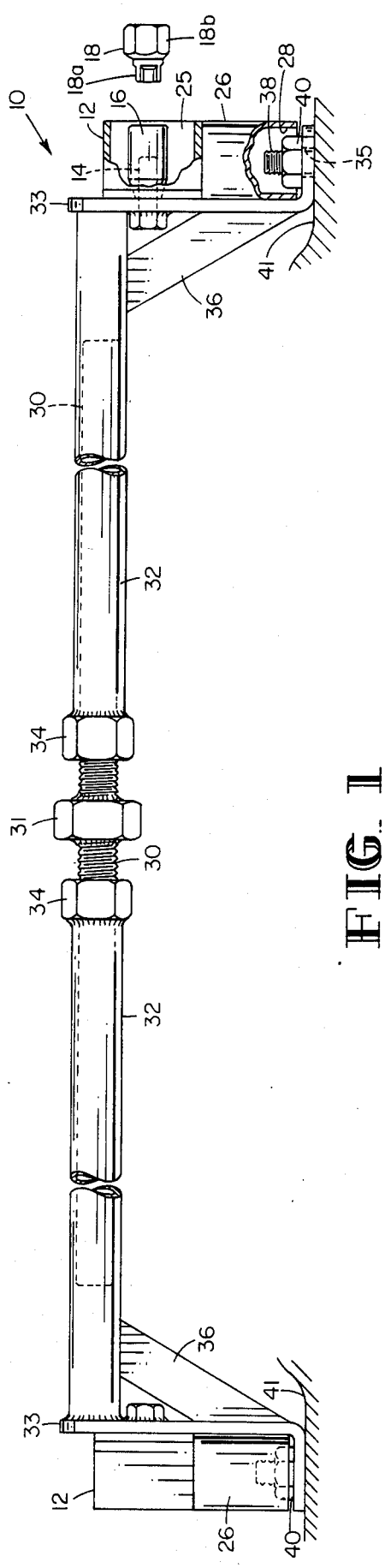
FIG. 1 is a side view of the tandem wheel lock bar attached to the wheels of a tandem axle trailer.

FIG. 1 shows the main components of the tandem wheel lock bar 10.

The tandem wheel lock bar 10 contains a threaded rod 30 with a nut 31 welded or otherwise attached at its center. Threaded rod 30 threads into threaded tubes 32. There are two threaded tubes 32. Each of tubes 32 threads onto threaded rod 30 up to nut 31. One end of threaded rod 30 is reverse threaded, corresponding to one of threaded tubes 32 which is likewise reverse threaded. Because of this, when nut 31 at the center of threaded rod 30 is rotated with respect to tubes 32, it will urge tubes 32 apart, thereby allowing the length of tandem wheel lock bar 10 to be adjustable. In the preferred embodiment, tandem wheel lock bar 10 is adjustable between 25 inches and 38 inches as measured between brackets 33. The broken lines in FIG. 1, within threaded tubes 32, illustrate the approximate position of rod 30 and tubes 32 when wheel lock bar 10 is in place on wheels 41. When lock bar 10 is in place as illustrated in FIG. 1, rotation of wheels 41 is impossible. Further, lug nut 40 is inaccessible. It is within housing 26, which is in turn attached to a section of walls 24 of lock box enclosure 25. Within lock box enclosure 25 is lock lug nut 16. When lock lug nut 16 is threaded onto lock lug bolt 14, it presses lock box 12 onto brackets 33.

Figure 4:
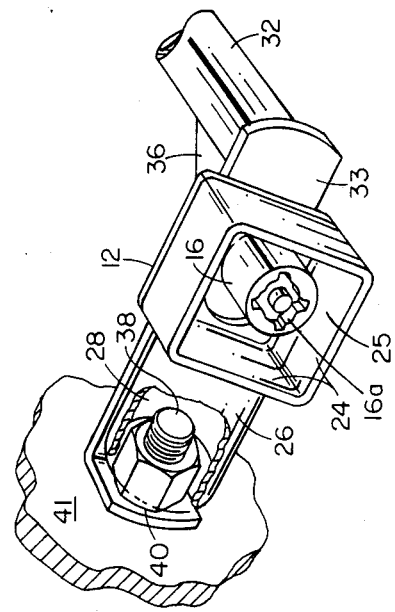
FIG. 4 shows the lock box secured to the lock bar with the lock box in a closed position.

Lock lug nut 16 is different than conventional nuts. The surface of lock lug nut 16 is cylindrical, as is illustrated in FIGS. 1 and 4. This prevents a wrench from being securely attached. Lock lug nut 16 also has an irregular keyway 16a at one end, as illustrated in FIG. 4. The end of lock lug nut 16 opposite keyway 16a is threaded like a convention nut, and tapered to fit into slot 22. To thread lock lug nut 16 onto lock lug bolt 14, a lock lug key 18 is provided. Lock lug key 18 has two parts: a body 18b, and male portion 18a which is an extension of body 18b and is cut to match keyway 16a. Body 18b of lock lug key 18 is shaped with flat sides, to be rotated with a conventional wrench. When a wrench (not shown) is placed on body 18b and male portion 18a inserted into matching keyway 16a, lock lug nut 16 can then be threaded onto lock lug bolt 14.

On the ends of threaded tubes 32 are affixed brackets 33 braced by struts 36 between threaded tubes 32 and brackets 33. Struts 36 support brackets 33. In the preferred embodiment brackets 33 are generally L-shaped. The top ends of brackets 33 are connected to threaded tubes 32 as illustrated in FIG. 1. The lower legs of brackets 33 contain holes 35 through which wheel lug bolts 38 pass. When lug nuts 40 are tightened, they securely affix brackets 33 and lock bar 10 to wheels 41. Lock box 12 slides over lug nut 40 and lug bolt 38 of wheel 41 and is locked in place by tightening lock lug nut 16 in the manner described in the previous paragraph.

Figure 3:
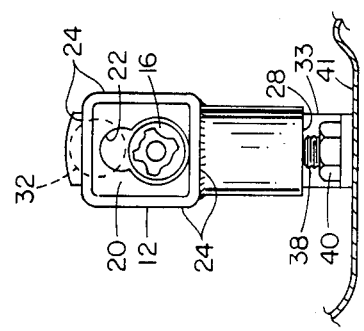
FIG. 3 is a view of the lock box in an open position, ready for removal from wheels.
Figure 2:
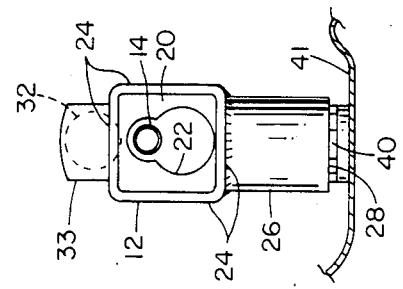
FIG. 2 is a view of the lock box, in a closed position, preventing removal of tandem wheel lock bar from wheels.

FIG. 2 shows the structure of lock box 12 and its position when securing lock bar 10 to wheels 41. Lock box 12 consists of two parts: lock box enclosure 25 and lock box housing 26. Walls 24 of lock box enclosure 25 are permanently attached to plate 20 which has slot 22. Lock box housing 26 is affixed to walls 24 of lock box enclosure 25 and is open at end 28. Slot 22 in plate 20 is sized to allow lock lug bolt 14 to pass through. The outline of the slot is illustrated in FIGS. 2 and 3. In FIG. 2 (lock box secured) lock lug nut 16 will cover slot 22. However, when lock box 12 is moved by sliding along brackets 33 to up position, thereby uncovering wheel lug nut 40 as is illustrated in FIG. 3, slot 22 at this position is large enough to remove lock box 12 from lock lug bolt 14, without removing lock lug nut 16.

FIG. 3 shows lock box 12 in an open position and ready for removal from bracket 33. In this position slot 22 is broad enough to remove lock box 12 from lock lug nut 16, while lock lug nut 16 remains on lock lug bolt 14. In position illustrated in FIG. 3 housing 26 is retracted from wheel lug nut 40, thereby allowing access to wheel lug nut 40 for affixing or removing tandem wheel lock bar 10 from vehicle. In closed and secured position illustrated in FIG. 2, housing 26 covers wheel lug nut 40 and wheel lug bolt 38, and slot 22 is at this point of a narrower diameter. With lug lock nut 16 screwed tight there can be no movement of lock box 12 from the closed and secured position in FIG. 2 to an open and removable position as shown in FIG. 3. Further, when lock lug nut 16 is tight and lock box 12 is in closed and secured position, there is no access to wheel lug nut 40 as it is enclosed within housing 26.

FIG. 4 illustrates how lock lug nut 16 is recessed within walls 24 of lock box enclosure 25. By enclosing lock lug nut 16 within lock box enclosure 25, a thief is prevented from attaching a pipe wrench or other means to lock lug nut 16, and rotating lock lug nut 16 off lock lug bolt 14. FIG. 4 also illustrates how housing 26 of lock box 12 fits over wheel lug nut 40 and wheel lug bolt 38, to prevent access to them. FIG. 4 illustrates the secured and locked position.

An alternate embodiment of lock bar 10 has a threaded rod attached at one end directly to a bracket 33 and omits a threaded tube 32. That is, instead of two threaded tubes 32 on which brackets 33 are affixed, a threaded rod is affixed to one of brackets 33 with threaded tube 32 affixed to the other of brackets 33. Threaded rod is then threaded directly into opposing threaded tube 32, and in this manner the lock bar 10 is adjustable in length.

The illustrations show only the preferred embodiment, and a number of alternate embodiments are anticipated utilizing the same disclosed invention. There are a number of alternate embodiments which one of ordinary skill in the art would find obvious. The drawings and disclosure are intended to cover all embodiments of the invention. Further, this invention is not limited to trailers and may be used with multi-axle vehicles. While the preferred embodiment discloses an anti-theft device for multiple wheels on the same side of the vehicle, the invention disclosed could secure wheels on opposite sides of a vehicle.

I claim:

1. An anti-theft device for a vehicle comprising:
   coupling means having a central portion, a first end and a second end;
   first attaching means connected to said first end of said coupling means, said attaching means detachably mounted to a first wheel of said vehicle, said first attaching means including a first bracket having a first end affixed to said first end of said coupling means, and a second end with an opening therethrough, said opening being large enough for a lug bolt of said first wheel to pass therethrough;
   second attaching means connected to said second end of said coupling means, said second attaching means detachably mounted to a second wheel of said vehicle, said second attaching means including a second bracket having a first end affixed to said second end of said coupling means, and a second end with an opening therethrough, said opening being large enough for a lug bolt of said second wheel to pass therethrough;
   first locking means capable of preventing detachment of said first attaching means from said first wheel without use of key means for locking and unlocking said anti-theft device to said first wheel;
   second locking means capable of preventing detachment of said second attaching means from said second wheel without use of key means for locking and unlocking said anti-theft device to said second wheel; and
   the combination of said coupling means, said first attaching means, said second attaching means, said first locking means and said second locking means when attached to said first and second wheels capable of preventing substantial rotation of said first and second wheels unless said combination is permitted to be released from said first and second wheels by use of said key means.

2. An anti-theft device for preventing the rotation of two wheels comprising:
   first and second threaded extensions and a threaded adjusting member, said adjusting member being positioned between said first and second extensions and threadably engaged with a first end of said first extension and a first end of said second extension, said combination of said first and second extensions and said adjusting member being capable of longitudinal adjustment;
   a first bracket connected to a second end of said first extension capable of accepting therethrough a first tire bolt of a first wheel;
   a first tire lug protector sized and shaped to fit about said first tire bolt with sufficient space to permit a first tire lug to engage said first tire bolt and to prevent access to said first tire lug when positioned about said first tire lug and being slidably attached to said first bracket to be movable between a position about said first tire lug and a position away from said first tire lug;
   a first locking bolt connected to said first bracket and a first lock lug, said lock lug threadably engaged on said first locking bolt having sides and a face and being capable of being rotated by means of a lock lug key when said first lock lug key engages said face of said first lock lug;
   a first lock guard connected to said first bracket spaced sufficiently away from said first locking bolt to permit said first lock lug to engage said first locking bolt and being spaced sufficiently closely to said first locking bolt and projecting sufficiently about said first lock lug to prevent access to the sides of said first locking lug;

said first locking lug capable of locking or unlocking the position of said first tire lug protector by being rotatably tightened or loosened, respectively;

a second bracket connected to a second end of said second extension capable of accepting therethrough a second tire bolt of a second wheel;

a second tire lug protector sized and shaped to fit about said second tire bolt with sufficient space to permit a second tire lug to engage said second tire bolt and to prevent access to said second tire lug when positioned about said second tire lug and being slidably attached to said second bracket to be movable between a position about said second tire lug and a position away from said second tire lug;

a second locking bolt connected to said second bracket and a second lock lug, said lock lug threadably engaged on said second locking bolt having sides and a face and being capable of being rotated by means of a lock lug key when said second lock lug key engages said face of said second lock lug;

a second lock guard connected to said second bracket spaced sufficiently away from said second locking bolt to permit said second lock lug to engage said second locking bolt and being spaced sufficiently closely to said second locking bolt and projecting sufficiently about said second lock lug to prevent access to the sides of said second locking lug;

said second locking lug capable of locking or unlocking the position of said second tire lug protector by being rotatably tightened or loosened, respectively;

said combination of first and second extensions being effective to prevent substantial rotation of said two wheels when attached to said wheels and being difficult to remove except by means of said lug key when said first and second locking lugs are tight on said first and second locking bolts.

3. The device in claim 2 wherein said adjustment member is capable of longitudinal adjustment of said anti-theft device between 25 inches and 38 inches as measured between said first bracket and said second bracket.

4. An anti-theft device for a vehicle comprising:

coupling means having a central portion, a first end and a second end;

first attaching means connected to said first end of said coupling means, said attaching means detachably mounted to a first wheel of said vehicle;

second attaching means connected to said second end of said coupling means, said second attaching means detachably mounted to a second wheel of said vehicle;

first locking means capable of preventing detachment of said first attaching means from said first wheel without use of key means for locking and unlocking said anti-theft device to said first wheel, said first locking means including a first locking bolt attached to said first attaching means;

a first lock box with a first body having a generally planer plate, said plate containing a slot therethrough of sufficient dimensions to allow said first locking bolt to pass therethrough and to slide perpendicular to a longitudinal axis of said first locking bolt;

a wall with a perimeter of said plate attached thereto;

a second body permanently engaged to said first body having a housing attached at a first end to said first body and open at a second end, said open second end being large enough to enclose a lug nut of said first wheel within;

a first keyed lock nut threadably attached to said first locking bolt when said first lock box is slidably engaged thereon, and a first matching lock nut key capable of threadably attaching said first keyed lock nut to said first locking bolt;

second locking means capable of preventing detachment of said second attaching means from said second wheel without use of key means for locking and unlocking said anti-theft device to said second wheel, said second locking means including a second locking bolt attached to said second attaching means;

a second lock box with a first body having a generally planer plate, said plate containing a slot therethrough of sufficient dimensions to allow said second locking bolt to pass therethrough and to slide perpendicular to a longitudinal axis of said second locking bolt;

a wall with a perimeter of said plate attached thereto;

a second body permanently engaged to said first body having a housing attached at a first end to said first body and open at a second end, said open second end being large enough to enclose a lug nut of said second wheel within;

a second keyed lock nut threadably attached to said second locking bolt when said second lock box is slidably engaged thereon, and a second matching lock nut key capable of threadably attaching said second keyed lock nut to said second locking bolt; and the combination of said coupling means, said first attaching means, said second attaching means, said first locking means and said second locking means when attached to said first and said second wheels capable of preventing substantial rotation of said first and said second wheels unless said combination is permitted to be relased from said first and second wheels by use of said key means.

5. The device in claim 4, said first attaching means further comprising a first bracket having a first end affixed to said first end of said coupling means, and a second end with an opening therethrough, said opening large enough for a lug bolt of said first wheel to pass therethrough; and said second attaching means further comprising a second bracket having a first end affixed to said second end of said coupling means, and a second end with an opening therethrough, said opening large enough for a lug bolt of said second wheel to pass therethrough.

6. The device in claim 4 wherein said central portion comprises a threaded rod portion and a threaded tube portion wherein a first end of said threaded rod is threadably attached to a first end of said threaded tube, said coupling means being adjustable thereby; and said first end and said second end, respectively, of said coupling means comprise a second end of said threaded rod and a second end of said threaded tube, respectively.

7. The device in claim 4, wherein said central portion comprises a threaded rod portion and two threaded tubular portions, said threaded rod being threadably attached to a first end of each said two threaded tubular portions, said first and second ends of said coupling means comprising a second end of each of said two threaded tubular portions, the length of said coupling means being adjustable by rotating said threaded rod with respect to said tubular portions.

* * * * *